United States Patent
Murai

(10) Patent No.: US 6,650,315 B2
(45) Date of Patent: Nov. 18, 2003

(54) MOUSE DEVICE WITH A BUILT-IN PRINTER

(75) Inventor: Yasushi Murai, Fussa (JP)

(73) Assignee: Casio Computer Co., Ltd., Tokyo (JP)

(*) Notice: Subject to any disclaimer, the term of this patent is extended or adjusted under 35 U.S.C. 154(b) by 242 days.

(21) Appl. No.: 09/861,814

(22) Filed: May 21, 2001

(65) Prior Publication Data

US 2002/0000974 A1 Jan. 3, 2002

(30) Foreign Application Priority Data

May 31, 2000 (JP) .................................... 2000-162513
Dec. 13, 2000 (JP) .................................... 2000-379150

(51) Int. Cl.[7] .............................................. G09G 5/00
(52) U.S. Cl. ................................... 345/163; 345/156
(58) Field of Search ............................. 345/163, 157; 400/110; 358/473, 296; 340/710, 706, 709

(56) References Cited

U.S. PATENT DOCUMENTS

| | | | |
|---|---|---|---|
| 4,697,244 A | * 9/1987 | Murakami et al. | 345/173 |
| 5,126,955 A | 6/1992 | Tomoda | |
| 5,311,208 A | * 5/1994 | Burger et al. | 345/163 |
| 5,791,792 A | * 8/1998 | Johnson et al. | 400/110 |
| 2001/0048447 A1 | * 12/2001 | Jogo | 345/620 |
| 2002/0030830 A1 | * 3/2002 | Day et al. | 358/1.8 |

FOREIGN PATENT DOCUMENTS

| | | | |
|---|---|---|---|
| DE | 33 14 041 A1 | 10/1984 | |
| EP | 0 642 097 A1 | 3/1995 | |
| EP | 1227432 A1 | * 7/2002 | G06K/11/18 |
| JP | 08-011364 A | 1/1996 | |
| WO | WO 99/44834 | 9/1999 | |

OTHER PUBLICATIONS

Patent Abstracts of Japan, vol. 1996, No. 05, May 31, 1996 & JP 08 011364 A ( Casio Comput Co LTD), Jan. 16, 1996 abstract; figures 1–4,10.

* cited by examiner

Primary Examiner—Vijay Shankar
Assistant Examiner—Nitin Patel
(74) Attorney, Agent, or Firm—Frishauf, Holtz, Goodman & Chick, P.C.

(57) ABSTRACT

A mouse device for use as an input device of a computer is provided that includes a housing in which recording paper is loadable, and a printer unit provided within the housing for printing on the recording paper print information received from the computer. The printer unit includes a paper loading section in which the recording paper is loaded, a platen roller for feeding the recording paper loaded in the loading section, a print head for printing on the recording paper fed by the platen roller, and a discharge port through which the recording paper is discharged after printing by the platen roller out of the housing while taking a substantially vertical attitude.

9 Claims, 9 Drawing Sheets

MOUSE DEVICE WITH A BUILT-IN PRINTER

BACKGROUND OF THE INVENTION

1. Technical Field

The present invention relates to mouse devices and more particularly to a mouse device used as a pointing device of a computer and having a built-in printer.

2. Background Art

In the past, U.S. Pat. No. 5,311,208 has disclosed a mouse device having a printing function. The mouse device is used to specify with a mouse function a range of any part of data displayed on a display screen of a computer, and to instruct the computer to print the specified range of data. The mouse device prints, using the printing function, the specified range of data based on corresponding print information output from the computer.

The mouse device has a printing head on a lower surface of its housing. The mouse device is placed on external recording paper so that the printing head can be moved on the recording paper to thereby print on the recording paper.

When all data of one-several pages displayed on the display screen of the computer are to be printed, a general printer such as a page printer is used. When an especially required part of data displayed on the display screen is to be extracted and left as a memorandum, the data part can be printed conveniently, using the mouse and printer functions of the mouse device.

Since the mouse device is moved on the external printing paper for printing, however, the external paper has a size larger than the mouse device. Data to be printed on the external recording paper is extracted partly from data displayed on the display screen of the computer and a quantity of the data is generally small in many cases.

Thus, when only a very small part of the data displayed on the display screen is extracted and printed on the external recording paper (for example, of an A4 size) by the mouse device, a very small part of the external recording paper is used. Thus, the data part printed on the paper is not in harmony in size with the printing paper. The printed recording paper is too large to leave as a memorandum and is difficult to handle. The printed part of the recording paper could be cut away, which is, however, troublesome and wastes of the paper would be produced.

A memorandum of simple contents can be expressed on a piece of paper having a size of 10–20 mm wide×50–100 mm long. Such size of paper is easy to handle. The mouse device, however, cannot print data, extracted partly from data displayed on the display screen of the computer, on a sheet of paper of such an appropriate size that the data looks to advantage. Thus, the mouse is very unsatisfactory.

If a guide that can move the housing of the mouse in a straight line is not used when the mouse device moves on the recording paper while printing, the housing of the mouse device can obliquely move or meander on the recording paper to thereby fail to perform satisfactory printing. That is, manipulation for printing is troublesome.

Disclosure of the Invention

It is therefore an object of the present invention to provide a mouse device with a built-in printer capable of sightly printing on a sheet of recording paper having a size suitable for being loaded in the mouse device and being left as a memorandum, and not on a sheet of recording paper having a large size such as the external recording paper.

Another object of the present invention is to provide a mouse device with a built-in printer having a discharge structure by which printed recording paper discharged out of the mouse device is difficult to droop onto a plane on which the mouse device moves to thereby avoid hindering the manipulation of the mouse device.

In order to achieve the above objects, the present invention provides a mouse device for use as an input device of a computer, comprising: a printer unit provided within a housing of the mouse device for printing based on print information received from the computer on recording paper loaded within the housing of the mouse device.

Since the mouse device prints print information from the computer on printing paper of a size suitable for being loaded within the housing thereof, a print that will be obtained looks to advantage as a memorandum.

The printer unit may comprise: a paper loading section in which the recording paper is loadable; feeding means for feeding the recording paper loaded in the loading section; a print head for printing on the recording paper fed by the feeding means; and means for providing a discharge port through which the recording paper printed by the print head is discharged by the feeding means out of the housing.

This mouse device prints recording paper loaded in its loading section while feeding the recording paper and then discharges it from the discharge port to the outside thereof. Thus, the discharged printed part of paper can be cut away at once and pasted as a memorandum, for example, to a notebook.

The discharge port may be provided extending vertically so that the printed recording paper is discharged taking a substantially vertical attitude out of the housing.

The mouse device discharges the printed part from its discharge port to the outside thereof while causing the printed part to take a substantially vertical attitude. Thus, the discharged printed paper is difficult to droop onto the plane where the mouse moves and hence there occurs no troubles in the manipulation of the mouse device even when the printer is under operation.

The discharge port may be provided at a position on a side of the housing where discharge of the recorded paper is free from being hindered by a user's fingers that hold the housing when the mouse device is manipulated.

Thus, a trouble is avoided in which the user will close the discharge port with his or her fingers to thereby jam the discharge port with the recording paper to be discharged out of the housing of the mouse device during manipulating the mouse device.

The recording paper loading section may have an open end through which the recording paper is loadable into the loading section, and comprising: a cover for closing the open end of the loading section openably.

Thus, only by opening the cover, recording paper can easily be loaded within the housing of the mouse device.

The mouse device may further comprise: print head moving means, responsive to closing and opening of the cover, for moving the print head to a print position and a non-print position, respectively.

Thus, even when the printing head is not moved by an operation different from the opening/closing operation of the cover, recording paper can be loaded in the loading section.

The mouse device may further comprise: a window provided on the cover for confirming externally the recording paper loaded in the loading section.

Thus, even when no cover is opened, the presence of the recording paper can be confirmed.

The recording paper may take a roll of recording tape.

Thus, use of such roll of tape-like recording paper enables successive printing without the necessity for exchanging, when sheets of recording paper are used, a printed sheet of printing paper with a new non-printed one each time such printing occurs.

The recording paper may take the form of a rectangle.

Thus, a print having a size appropriate as a memorandum is obtained without requiring any cutting operation after printing.

The printer unit is not limited to a one that prints while feeding the recording paper. The printer unit may comprise: a recording paper loading section in which the recording paper is loadable; printing means comprising a print head that will be moved to and print on recording paper loaded in the recording paper loading section.

Thus, even such printer unit can print any part extracted from a character string displayed on a display screen of the computer on a sheet of paper having a relatively small size so as to be left as a memorandum that looks to advantage.

The print head may comprise a thermal head; and the recording paper comprises heat-sensitive paper colored by heat produced by the thermal head.

Thus, no ink ribbon is required and hence the printer unit is simplified in composition.

BEST MODE FOR CARRYING OUT THE INVENTION

One embodiment of the present invention will be described next with reference to the accompanying drawings.

Figure 1:
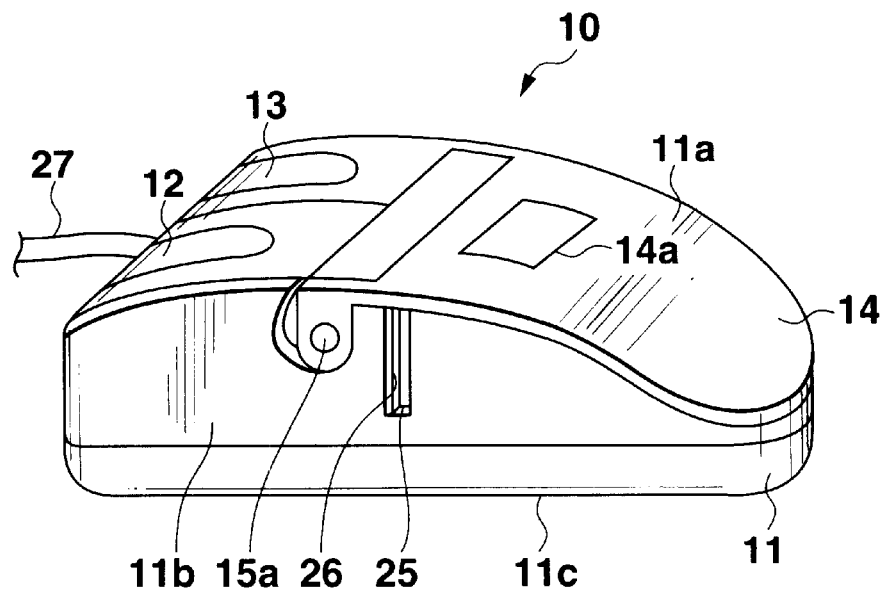
FIG. 1 is a perspective view of a mouse device with a built-in printer according to one embodiment of the present invention with a cover being closed.
Figure 2:
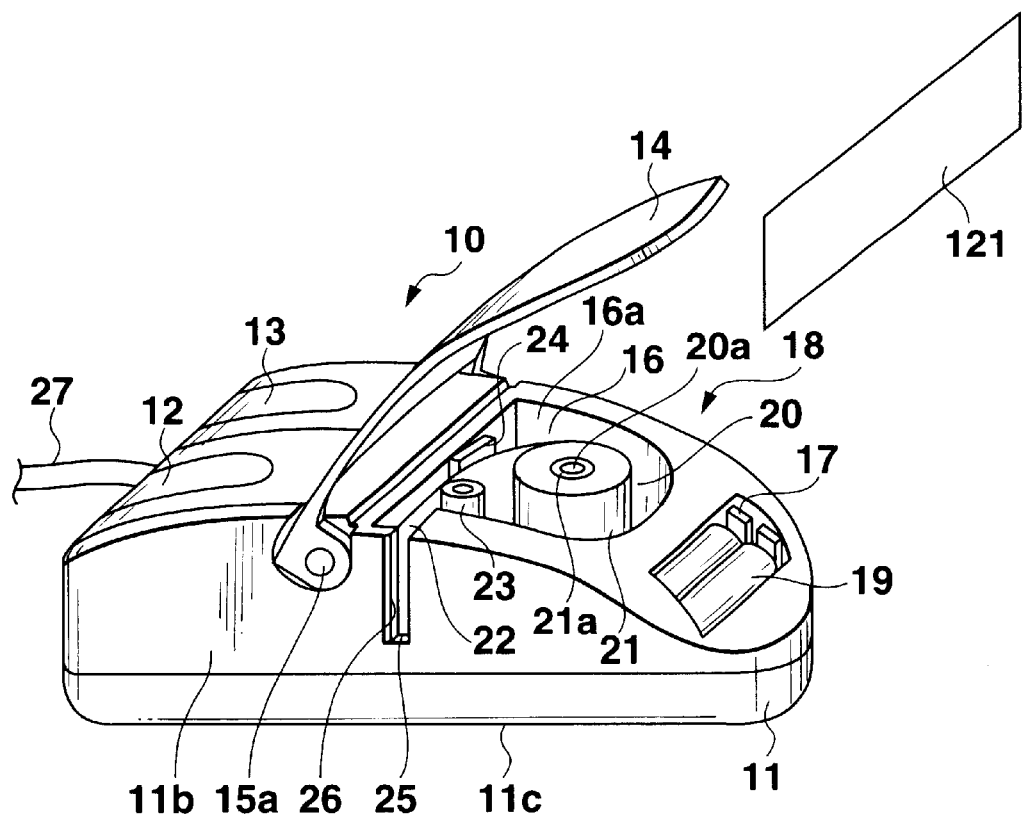
FIG. 2 is a perspective view of the mouse device of FIG. 1 with the cover being open.

FIG. 1 is a perspective view of a mouse device with a built-in printer according to one embodiment of the present invention with a cover being closed, and FIG. 2 is a perspective view of the mouse device of FIG. 1 with the cover being open.

As shown in FIGS. 1 and 2, the mouse device 10 has a left button 12 and a right button 13 on a top surface 11a of a housing 11 thereof with a cover 14 being provided turnable around a pair of attaching shafts 15a and 15b so as to be opened and closed. As shown in FIG. 2, a printer receiver 16 open at its upper end 16a and an open cell receiver 17 are provided below the cover 14 within the housing 11. A printer 18 is provided within the printer receiver 16. Cells 19 are received within the cell receiver 17 so as to be a drive source for the printer 18.

Provided within the printer receiver 16 are a recording paper loading section 20, a paper feeding path 22 through which a part of recording paper tape 21 is fed from its roll loaded in the loading section 20 while taking an upstanding attitude within the housing 11, a platen roller 23 that feeds or carries the recording paper tape 21 along the feeding path 22, and a thermal head 24 that prints on a part of recording paper tape 21 carried by the platen roller 23. Provided at an end of the paper feeding path 22 is a discharge port 25 through which the part of paper tape 21 printed by the thermal head 24 is discharged from the housing 11 to its outside.

Figure 3A:
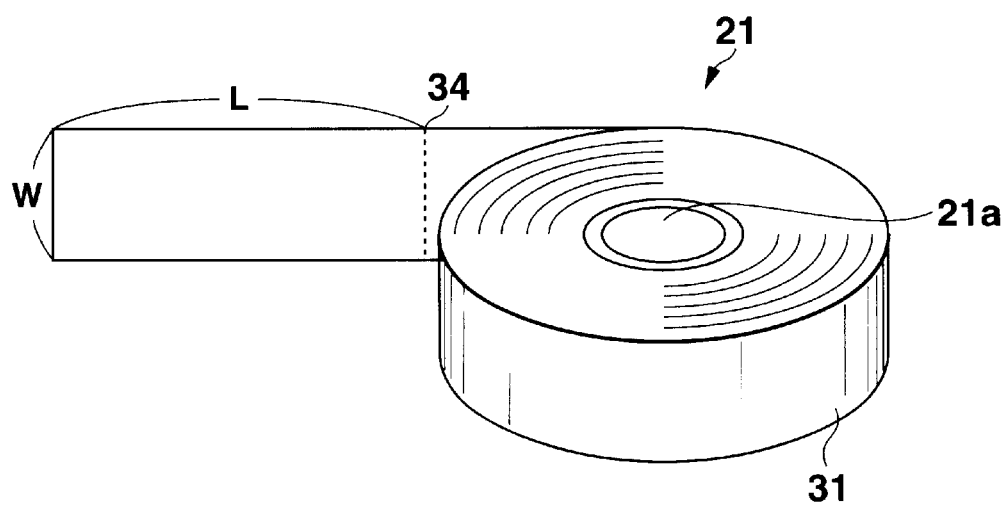
FIG. 3A is a perspective view of a roll of recording paper tape for use in the mouse device.

The paper loading section 20 has a substantially vertical paper holding shaft 20a at the center of the loading section over which the roll of recording paper tape 21 is fitted rotatably at its hollow cylindrical core 21a (FIG. 3A).

A paper part fed out from the roll of recording paper tape 21 is disposed within the paper feeding path 22 so as to be movable through the path 22 while taking an upstanding attitude. A sensor 59 (FIGS. 6 and 10) is provided near the paper feeding path 22 to read a mark annexed to the part of the recording paper tape 21.

The platen roller 23 is provided near and halfway the paper feeding path 22 so as to be rotatable around its vertical axis. When the platen roller 23 is rotated, the roll of recording paper tape 21 loaded on the loading section 20 feeds out a part thereof through the paper feeding path 22 and after printing, discharges the printed paper part of from the discharge port 25 to the outside of the housing 11.

The thermal head 24 is provided on the opposite side of the paper feeding path 22 to the platen roller 23, and includes an array of heating elements arranged in a substantially vertical line parallel to the axis of the platen roller 23. When the thermal head 24 is at a printing position, the thermal head 24 presses a corresponding part of recording paper tape 21 against the platen roller 23.

Since the thermal head 24 is provided substantially vertical near and halfway the paper feeding path 22, the heating elements thereof are arranged widthwise across the recording paper tape. Print information such as characters to be printed on the recording paper tape 21 comprises an array of a plurality of print data arranged in rows and columns with a plurality of print data in each column corresponding respectively to the plurality of heating elements arranged in a line. The plurality of print data are fed sequentially in units of a column to the thermal head 24 to heat its plurality of heating elements selectively to thereby print the print information that includes characters lengthwise on the recording face 31b of the recording paper tape 21 to be carried by the platen roller.

The discharge port 25 is provided on the outside of the housing 11 at an end of the paper feeding path 22 so as to have a size large enough for the printed paper to pass through the port to the outside of the housing 11 while taking a vertical attitude.

The discharge port 25 is preferably provided at such a position on the outside of the housing 11 that discharge of the recording paper tape 21 is not hindered by the user's fingers that hold the housing 11. Thus, in the illustrated example, as shown in FIGS. 1 and 2, the discharge port 25 is provided, for example, substantially at the center of the left side 11b of the housing 11 when the user is a right hander. The port 25 may be provided at any position on the outside of the housing as long as the port is not closed by the user's fingers, which manipulate the mouse. Thus, the position of the discharge port is not limited to that of FIGS. 1 and 2. For example, the port may be provided at an appropriate position on the opposite or right side of the housing to the left side 11b or at an appropriate position on the front side of the housing from which a mouse cable 27 extends forwards.

Note that if the mouse device need not be manipulated during printing the discharge port 25 may be provided at any desired position on the housing 11.

A cutter 26 is provided at the discharge port 25 to cut away the printed part of the recording paper tape 21 discharged from the housing 11.

In the printer 18, the recording paper tape 21 is fed from its roll loaded in the loading section 20 through the feeding path 22 by rotation of the platen 23, printed by the thermal head 24, and then discharged through the discharge port 25 out of the housing 11. In printing, the cover 14 is closed. The roll of paper tape 21 loaded in the loading section 20 can be confirmed externally through the window 14a formed in the cover 14.

X- and Y-axis encoders 54 and 55 (FIG. 6) are provided within the housing 11 to sense quantities of movement of the mouse 10 in right-left and back-forth directions. A rotatable ball 53 (FIG. 6) is provided on a bottom 11c of the housing 11 to transmit the quantities of movement of the mouse 10 to the encoders.

In the mouse device, signals that move the mouse pointer in vertical and horizontal directions on the display screen of the computer based on the quantities of movement of the mouse device sensed by a movement quantity sensing means including the X- and Y-axis encoders and the ball, and signals representing manipulation of the right and left buttons 13 and 12 are delivered through the mouse cable 27 to the computer.

Figure 3B:
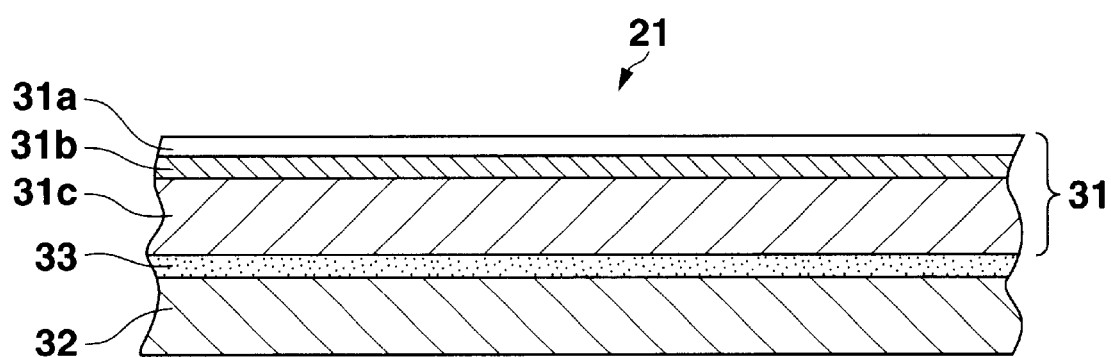
FIG. 3B is a cross-sectional view of part of the recording paper tape for use in the mouse device.

FIG. 3A is a perspective view of the roll of recording paper tape for use in the mouse device. FIG. 3B is a cross-sectional view of a part of the recording paper tape of FIG. 3A. In FIG. 3A, the roll of recording paper tape 21 to be loaded in the loading section 20 contains the hollow cylindrical core 21a around which the tape is wound, as described above. As shown in FIG. 3B, the recording paper tape includes a recording paper (heat-sensitive) body 31, an adhesive layer 33 adhering to a back of the recording paper body, and a paper layer 32 pasted separably to the adhesive layer 33. After printing, the printed tape part is cut away and its paper layer 32 can be separated from the adhesive layer 33 of the printed tape part so that the printed tape can be used as a label. The recording paper tape body 31 includes a tape base 31a, a heat-sensitive coloring layer 31b coated with a heat-sensitive color former to constitute a printing face, and a protective layer 31c covering the heat-sensitive coloring layer 31b.

The recording paper tape 21 has perforated cutting lines 34 provided at predetermined intervals L over the length of the recording paper tape 21 through the total thickness of the heat-sensitive paper tape body 31 and separable paper layer 32. When the printed part of the recording paper tape is to be cut away, the printed tape part is applied at its perforated cutting line to the cutter 34 and then torn off. The printed part has a width of 10–20 mm and a length L of 50–100 mm to thereby provide a memorandum having a size suitable for handling. A mark (not shown) is beforehand printed for print controlling purposes on the separate paper tape 32 provided on the back of the recording face of the tape 21. The mark is read by the sensor 59 of the printer to determine a print start position of the thermal head 24 on the recording tape 21 and also used to control a quantity of movement of the recording tape 21 so that when the printing ends the target perforated cutting line 34 on the recording tape 21 moves to the position of the cutter 26 provided at the discharge port of the tape feeding path 22. A plurality of such marks are each provided in a respective one of the strip-like printing areas, each of which is delimited by the adjacent perforated cutting lines 34.

As shown in FIG. 2, when the roll of recording tape 21 is to be loaded within the housing 11, the mouse cover 14 is opened, the roll of tape 21 is fitted at its hollow cylindrical core 21 onto the paper holding shaft 20a provided in the paper loading section 20, and a tape part fed out from the roll of recording paper tape 21 is then extended between the platen roller 23 and the thermal head 24. At this time, the thermal head 24 is spaced from the platen roller 23 by a head moving mechanism of FIGS. 4 and 5.

Figure 4A:
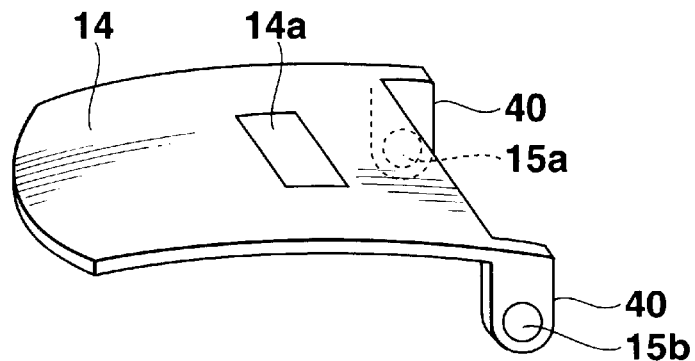
FIG. 4A illustrates a composition of the cover provided on the top of the housing of the mouse device.
Figure 4B:
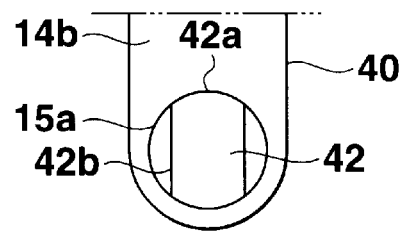
FIG. 4B partially illustrates an attaching section of the cover.
Figure 5A:
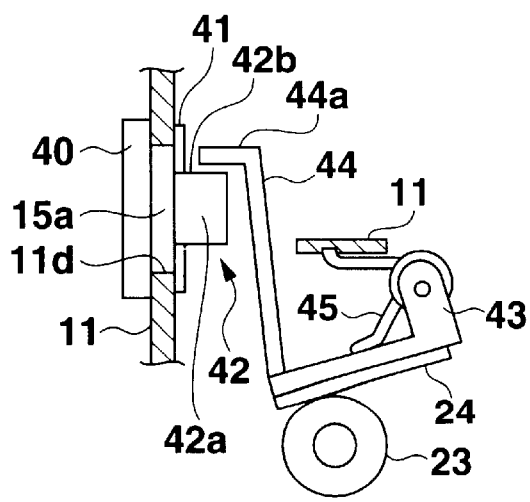
FIG. 5A illustrates the positional relationship between the attaching section, a thermal head, and a platen roller with the cover being closed.
Figure 5B:
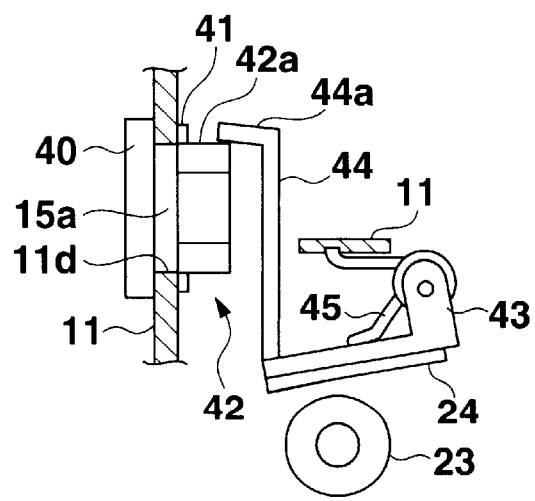
FIG. 5B illustrates the positional relationship between the attaching section, thermal head, and platen roller with the cover being open.

FIG. 4A illustrates a composition of the cover provided on the top of the housing of the mouse device. FIG. 4B partially illustrates each of a pair of attaching sections of the cover. FIG. 5A illustrates the positional relationship between one attaching section, a thermal head, and a platen roller with the cover being closed. FIG. 5B illustrates the positional relationship between the attaching section, thermal head, and platen roller with the cover being open.

As shown in FIGS. 4A and 4B, the cover 14 has at its edge a pair of spaced attaching sections 40 each having a respective one of pivots 15a and 15b, each of which is received in a respective one of a pair of opposite holes 11d in the housing 11, so that the cover 14 is turnable relative to the housing 11. As shown in FIGS. 5A and 5B, each of the pivots 15a and 15b received in the corresponding housing holes 11d is prevented by an E-like ring 41 from slipping off from the hole 11d. The pivots 15a and 15b each have an engaging portion 42 composed of a pair of opposed arcuate sections 42a and a pair of opposite parallel flat sections 42b (FIG. 4B). The thermal head 24 is supported by an L-like head support 43 turnably supported at one end with an arm 44 extending substantially parallel to a shorter branch of the L-like head support 43 from its other end. The head support 43 is biased by a spring 45 toward the platen roller 23. The arm 44 has at its end a bent end 44a biased so as to abut on the engaging portion 42 of the pivot 15a.

As shown in FIG. 5A, when the cover 14 has been closed, the flat section 42b of the engaging portion 42 is spaced from the bent end of the arm 44, and the thermal head 24 is pressed by the resiliency of the spring 45 against the platen roller 23 or is at a print position. As shown in FIG. 5B, when the cover 14 is opened, the engaging portion 42 of the attaching section 40 rotates, the arcuate section 42A of the engaging portion abuts on the bent end 44a of the arm 40 to thereby move the head support 43 through the arm 44 against the resiliency of the spring 45. Thus, the thermal head 24 attached to the head support 43 is spaced from the platen roller 23 or moved to a non-print position. That is, as the cover is opened and closed, the thermal head 24 moves to the non-print and print positions, respectively.

Figure 6:
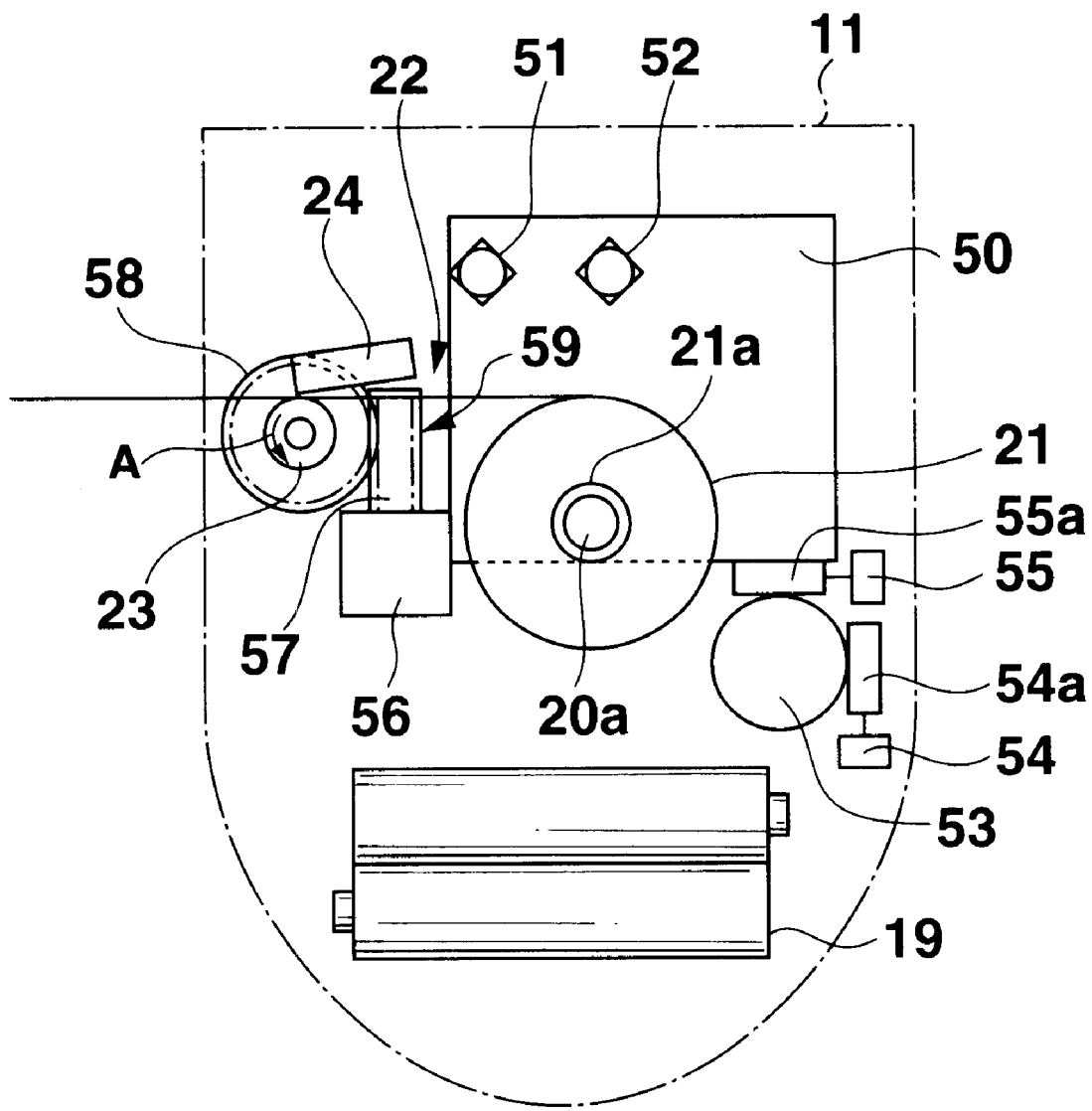
FIG. 6 schematically illustrates the positional relationship between the components of the mouse device provided within its housing, as viewed from above, when the top of the housing is removed away.

FIG. 6 schematically illustrates arrangement of the respective components of the mouse device provided within the housing 11, as viewed from above, with the housing top being removed away. In FIG. 6, reference numeral 50 denotes a circuit board on which the parts of the mouse device are attached; and 51 and 52 denote switches that will be turned on/off by the right and left buttons 13 and 12, respectively. As described above, reference numeral 53 denotes the ball rollable on the bottom 11c of the housing 11. Also, as described above, reference numerals 54 and 55 denote the X- and Y-axis encoders that sense amounts of rotation of the ball 53 in the X- and Y-axis directions through rollers 54a and 55a, respectively.

Referring to FIG. 6, the printer 18 includes within the housing 11 the platen roller 23 and thermal head 24 near and halfway the paper feeding path 22, and a platen roller driving mechanism that includes a step motor 56, a worm 57 driven by the motor, and a worm wheel 58 meshing with the worm. The step motor 56 is driven by power of the cells 19. The output power from the motor 56 is transmitted via the worm 57, and the worm wheel 58 meshing with the worm 57 to the platen roller 23, which has the same shaft as the worm wheel 58. Thus, when the platen roller 23 is rotated in the direction of an arrow A by the motor 56, the recording paper tape 21 is fed out from its roll loaded in the loading section 20 and moved through the paper feeding path 22 while taking a substantially vertical attitude. During feeding of the tape 22, the sensor 59 provided upstream of the thermal head 24 reads a mark formed on the back of the recording face of the tape 21, at which time the thermal head 24 starts to be driven. The sensor 59 includes an optical sensor composed of a light emitting unit and a light detecting unit so that the sensor 59 senses the mark with a reflection of light applied to the back of the recording tape 21. In this case, the mark uses a color different from that of the back of the recording tape 21 and hence the former reflectance is different from that of the back of the recording tape.

Figure 7:
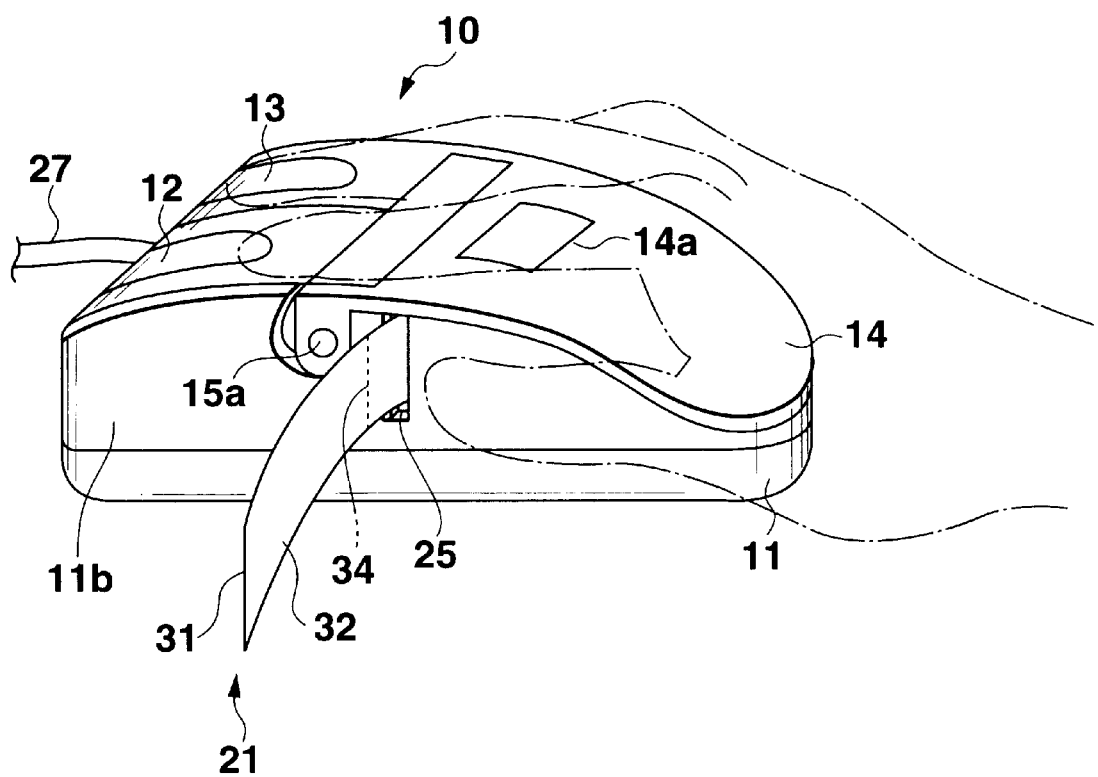
FIG. 7 illustrates the mouse under the user's manipulation.

FIG. 7 illustrates the mouse 10 under manipulation of the user. As shown in FIG. 7, the user grasps the mouse 10 with his or her fingers and drags the mouse while pressing the left mouse button 12 to thereby move the mouse pointer displayed on the computer display screen and then select a range of characters to be printed from a character string displayed on the display screen of the computer. By performing a predetermined process, for example, including operating the right button 13 of the mouse device 10, print information corresponding to the selected range of character string is delivered from the computer via the mouse cable 27 to the mouse device 10.

The printer 18 of the mouse device 10 is then started up with the print information, the recording tape 21 of the roll loaded on the loading section 20 within the housing 11, as shown in FIG. 6, is delivered by rotation of the platen roller 23 toward the discharge port 25. During this operation data based on the print information is printed on the recording tape 31 by the thermal head 24. In more detail, a mark formed on the back of the recording tape 21 is sensed by the sensor 52, at which time the heating elements of the thermal head 24 are heated and the data based on the print information is printed in an print area delimited by related two adjacent perforated cutting lines 34. After printing, the printed part of the tape 21 is discharged through the discharge port 25 to the outside of the mouse device while taking a substantially vertical attitude. Thus, the printed part of the tape is difficult to droop onto a plane on which the mouse 10 moves. Thus, even when the mouse 10 moves on the plane, the printed part of the tape 21 is not caught by the mouse 10.

Since the discharge port 25 is provided on the housing side 11b where discharge of the printed part of the tape 21 is not hindered with the user's fingers that hold the housing 11. That is, the discharge port 25 is free from being closed by the user's fingers during manipulation of the mouse device and also being jammed with the printed recording tape 21.

As shown in FIG. 3, the recording tape 21 has perforated cutting lines 34 provided at the predetermined intervals L thereon over the length thereof. When the print information is printed in the print area delimited by related two adjacent perforated cutting lines 34, the printing tape 21 is moved so that a perforated cutting line 34 defining the trailing end of the print area comes to the cutter 26. After printing, by applying the printed tape part to the cutter 26 at that perforated cutting line and tearing off the printed tape part, the printed strip 21 is easily obtained and can be used as a memorandum.

Figure 8:
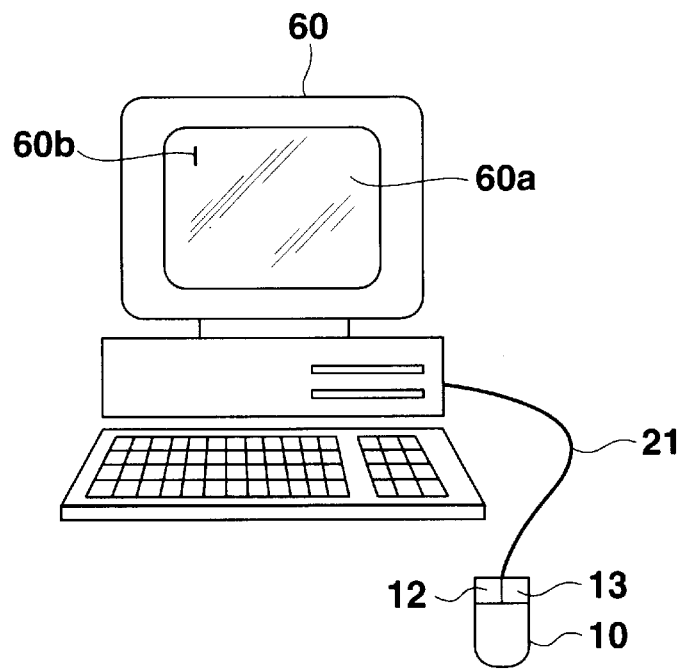
FIG. 8 illustrates the mouse being connected to a computer.
Figure 9:
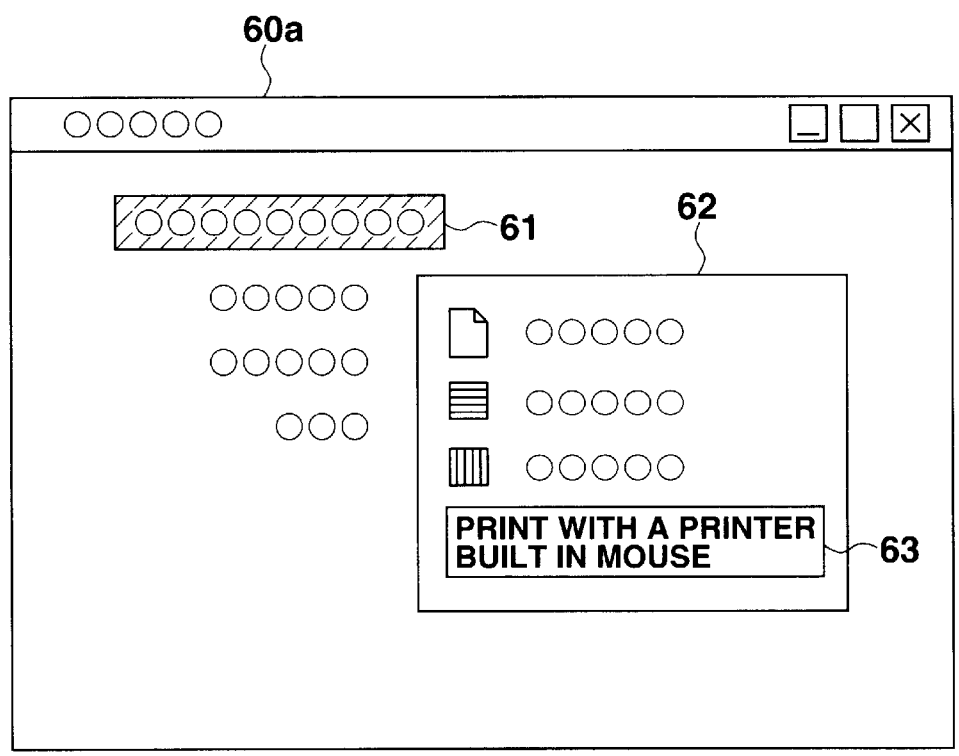
FIG. 9 illustrates a composition of a picture displayed on a display screen of the computer.

Printing of the print information with the inventive mouse device 10 in the computer system will be described. FIG. 8 illustrates the mouse 10 connected to the computer 60. FIG. 9 shows a display screen of the computer 60.

As shown in FIG. 8, the mouse device 10 of this embodiment is of an USB type that is connected to an USB connector of the computer 60 through the mouse cable 27. When the user manipulates the mouse 10, for example, on a desk, the mouse pointer 60b displayed on the computer display screen 60a is moved correspondingly.

As shown in FIG. 9, when the user clicks the left button 12 to drag a range of a part of a character string displayed on the display screen 60a to thereby select it with the mouse pointer 60b, and then clicks the right button 13, a predetermined menu picture 62 appears on the window. When the user selects with the mouse pointer 60b an item 63 "Print with a printer built in the mouse" from choice items of the menu picture 62, print information corresponding to the selected range of the part of the character string is transferred via the mouse cable 27 to the mouse device 10 and printed on the recording tape 21 loaded within the housing 11.

Figure 10:
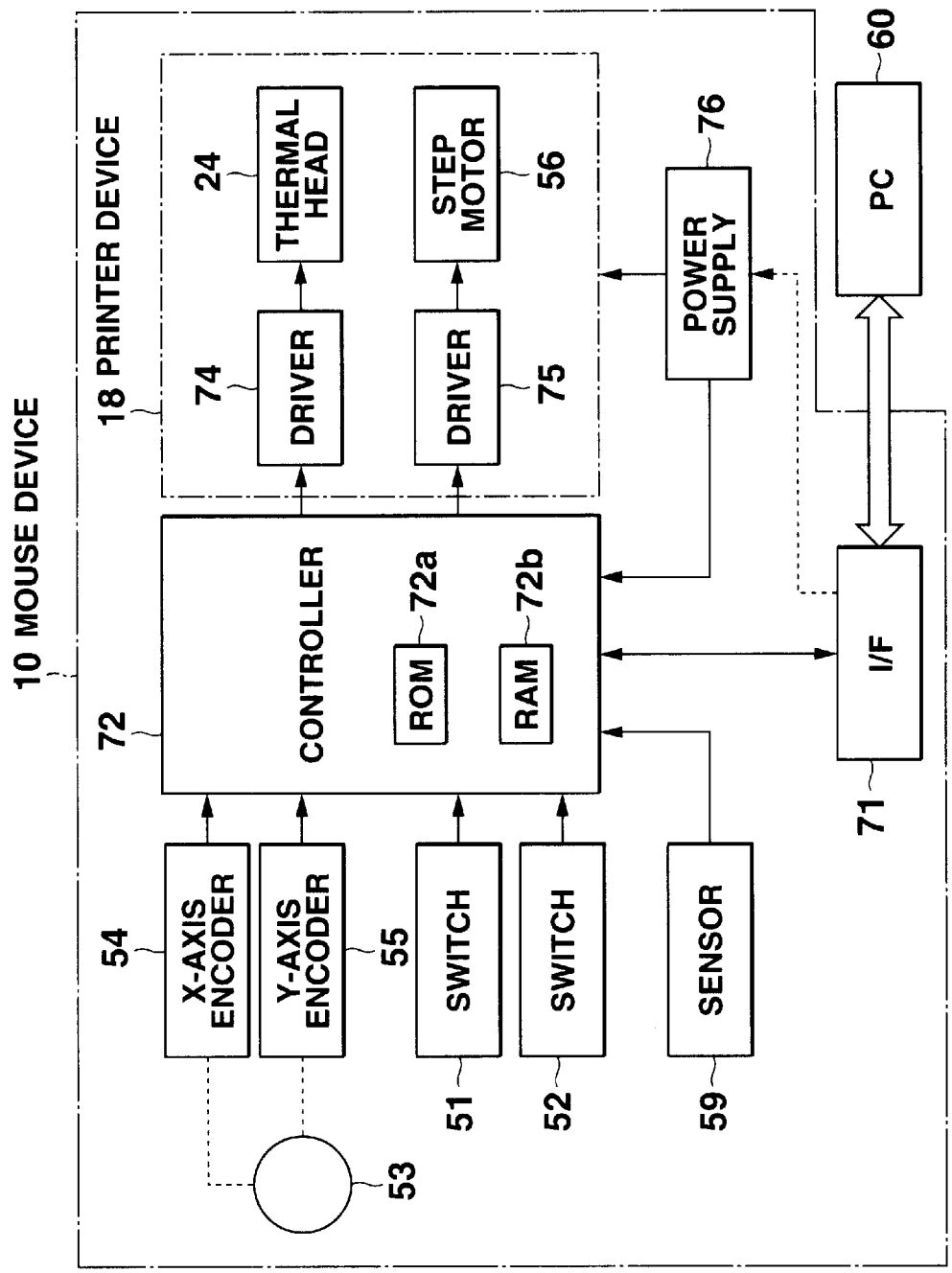
FIG. 10 is a block diagram of an electronic circuit of the mouse device.

FIG. 10 is a block diagram of an electronic circuit of the mouse device 10, which is connected to the computer (PC) 60 via the mouse cable 27. The computer 60 comprises a general-purpose computer such as a personal computer. The computer 60 receives a signal to move the mouse pointer and a signal representing button manipulation via an interface (I/F) 71, and moves the mouse pointer on the displayed picture, selects an object indicated by the mouse pointer, and then outputs print information in accordance with a request from the mouse 10.

As shown in FIG. 10, the mouse device 10 comprises a controller 72, for example, of a one-chip microprocessor that in turn comprises a ROM 72a and a RAM 72b. The controller 72 controls the respective operations of the pointing device and the printer 18.

The controller 72 is connected to the X- and Y-axis encoders 54 and 55 that sense rotational quantities of the ball 53 in the X- and Y-directions, switches 51 and 52 operated by the manipulation buttons 12 and 13, respectively, provided on the upper surface 11a of the housing 11, and the sensor 59 that senses a mark formed on the back of the recording tape 21. The controller 72 is further connected to a driver 74 of the thermal head 24 of the printer 18 and a driver 75 of the step motor 56 to rotate the platen 23, and also connected to a power supply 76.

The power supply 76 includes the cells 19 of FIG. 2 that provides the controller 72 and the printer 18 with required voltages. The power supply 76 is not limited to the cells 19, but may comprise a power supply of the computer 60 to provide the controller 72, printer 18 and other components with required power through the mouse cable 27.

Figure 11:
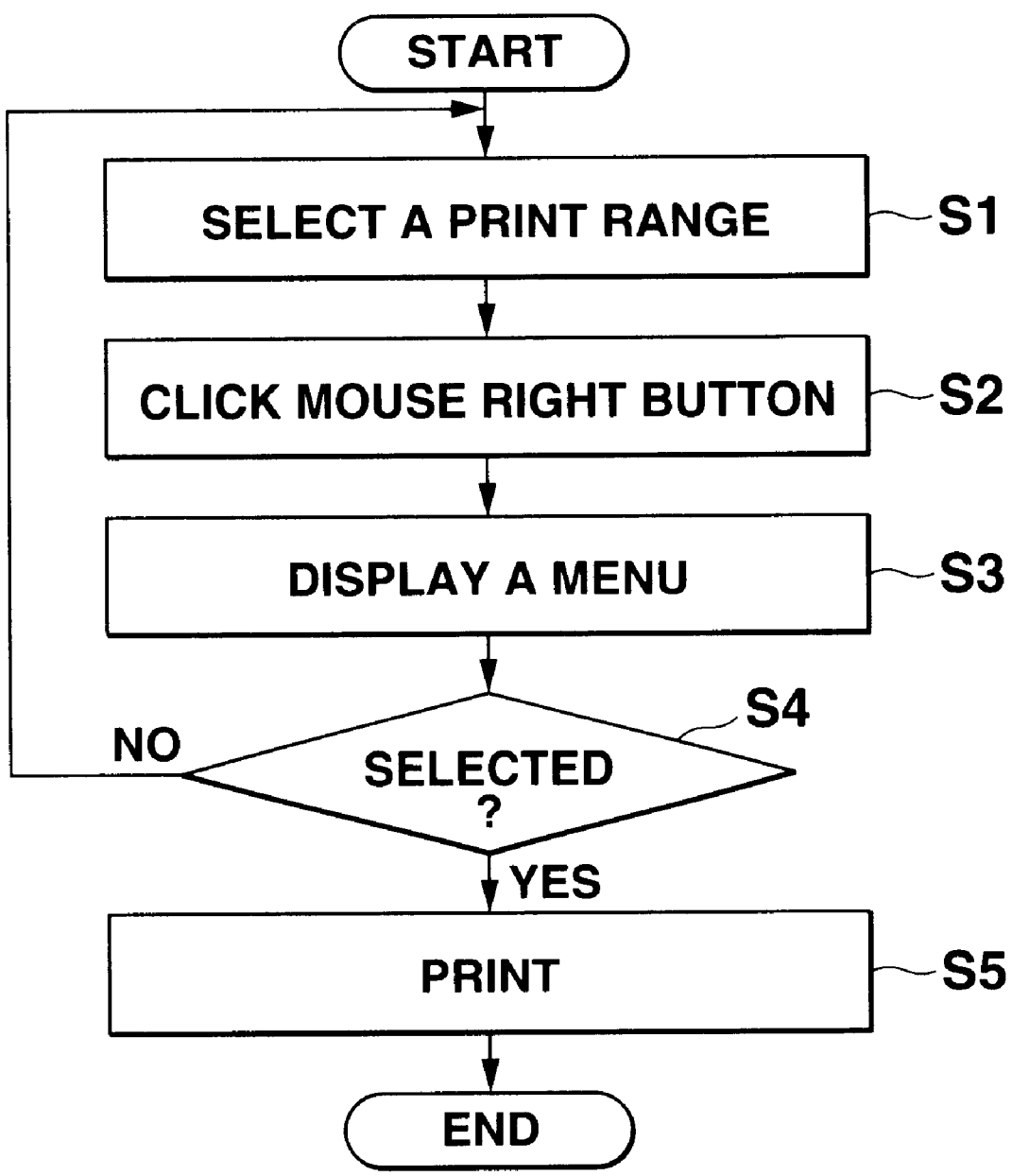
FIG. 11 is a flowchart of a printing process performed by the computer and the mouse device.

FIG. 11 is a flowchart of a printing process performed by the computer 60 and the mouse device 10. A program involving the printing process is stored in the computer 60.

As shown in FIG. 9, when the operator performs a dragging operation that includes clicking the left button 12 while moving the mouse 10 to select with the mouse pointer 60b a range of a part of a character string displayed on the display screen 60a, and then clicks the right button 13, a predetermined menu picture 62 is displayed on the window (steps S1–S3).

When the item 63 "Print with a printer built in mouse" of the menu picture 62 is selected with the mouse pointer 60b (Yes in step S4), print information including pattern data that represents the character string part of the selected range 61 is transferred through the mouse cable 27 to the mouse device 10. Since the size of a print area of the recording tape 21 is predetermined, the maximum possible number of printing lines in the print area and the maximum possible number of printing characters for each line are predetermined. Correspondingly, print formats including a character size, an inter-character gap, and an inter-line gap in the print area where the print information is printed are set automatically, and print pattern data developed in the print formats is transferred to the mouse device 10. The drivers 74 and 75 of the thermal head 24 and the step motor 54 of the printer 18 are driven under control of the controller 72 to print the print information in accordance with the print format data on a recording tape 21 fed out from its roll loaded within the housing 11 of the mouse device 10 (step S5).

The printing process in step S5 will be described in more detail. When the roll of a recording tape 21 has been loaded within the housing 11, and the mouse device receives printing information from the computer 60, the step motor 56 and hence the platen roller 23 are rotated to feed the recording tape 21 toward the discharge port 25. When a mark formed on the back of the recording tape 21 is sensed by the sensor 59, the heating elements of the thermal head 24 are heated based on the print information to print corresponding data on a print area of the tape delimited by related two adjacent perforated cutting lines. Then, the printing tape is moved by the platen roller 23 to a position where the trailing perforated cutting line 34 on the tape comes to the cutter 26 by controlling the number of steps of driving the step motor 56 since the perforated cutting line 34 and the mark are in predetermined positional relationship.

As described above, since the print information is printed on a part of the recording tape 21 having a size appropriate for a memorandum, data on any part of on a character string displayed on the computer display screen 60a can be printed so that it looks to advantage, and left as a memorandum.

Since the mouse 10 discharges the printed part of the recording tape 21 so as to take a substantially vertical attitude from the discharge port 25 on the housing to its outside, the discharged recording tape is prevented from drooping onto a plane on which the mouse device 10 moves. Thus, the recording tape 21 discharged from the mouse device will not hinder the movement of the mouse device 10 and not be caught or broken by the mouse device 10. Thus, the printed tape part can be left as a memorandum without being damaged.

As shown in FIG. 2, the roll of printing tape 21 is loaded in the receiver 16 open at its upper end 16a below the cover 14 of the housing 11. Thus, only by opening the cover 14, the roll of recording tape 21 can easily be loaded within the housing 11. The thermal head 24 moves automatically to the print and non-print positions in conjunction with the closing and opening, respectively, of the cover 14, by the head moving mechanism described with respect to FIGS. 4A, 4B and 5A, 5B. Thus, when a part of the recording paper tape 21 is placed between the platen roller 23 and the thermal head 24, no troublesome operation is required that includes moving the thermal head 24 by operating manually a lever that would otherwise be required.

Since the cover 14 has the window 14a through which the roll of recording paper tape 21 loaded in the loading section 20 can be seen, the presence of the roll of recording paper tape 21 can be confirmed without opening the cover 14.

While in the embodiment the roll of printing tape is illustrated as being used, a strip-like paper sheet 121 of FIG. 2 may be used for printing. Like the roll of printing tape 21, the sheet 121 includes a heat-sensitive coloring layer on the printing face thereof. The sheet 121 is equal in size to a print area of the recording tape 21 delimited by any two adjacent perforated cutting lines. When print information is printed on such sheet 121, the sheet 121 is curled at one end around the tape holding shaft 20a in the tape loading section 20 and placed at the other end between the platen roller 23 and the thermal head 24 when the cover 14 is open, as shown in FIG. 2. When the cover 14 is closed, the thermal head 24 presses the sheet 121 against the thermal head 24. The subsequent printing operation is as described above. That is, when print information is output from the computer 60 to the printer unit 18, the printer unit 18 is started up, and the platen roller 23 is rotated to feed the sheet 121 toward the discharge port 25, during which the print information is printed on the sheet by the thermal head 24. The printed sheet 121 is then discharged from the discharge port 25 to the outside of the housing 11.

As described above, use of the strip-like sheet 121 requires no cutting operation after printing and provides a print having a size appropriate for the memorandum. When a roll of printing tape is used, successive printing operations can be performed until the roll of printing paper tape is used up without taking the trouble to exchange, when sheets of printing paper are used for printing purposes, a printed sheet of paper with an unprinted one each time the printing is finished.

Figure 12:
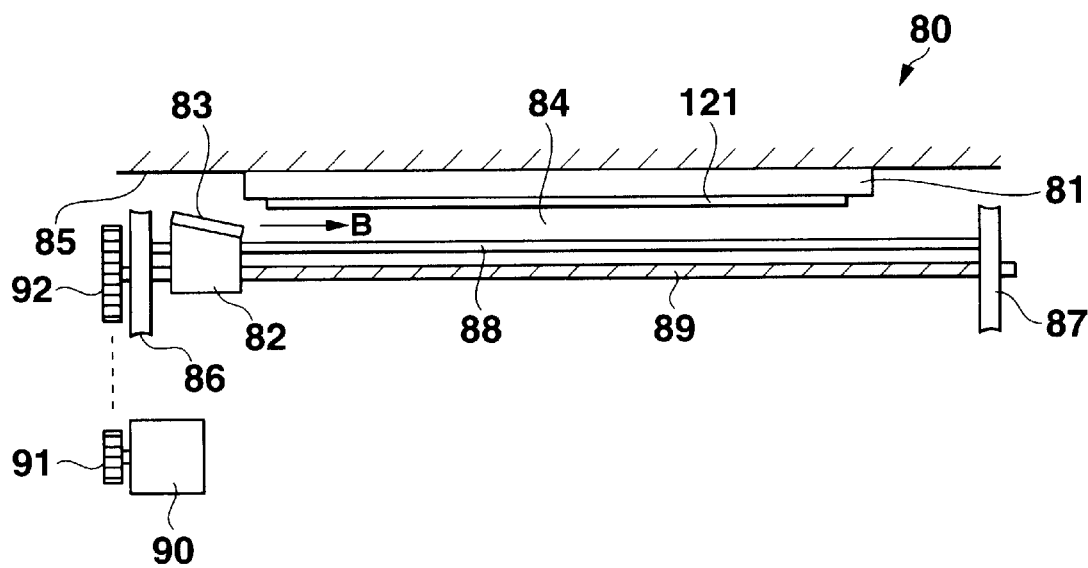
FIG. 12 illustrates a composition of a printer built in a mouse device as another embodiment of the present invention.

The printer unit 18 built in the mouse device 10 is not limited to that which prints on the recording paper by moving the same, as in the present embodiment. For example, the printer unit 18 may be a one that includes a printing head that will be moved for printing. This will be illustrated in a second embodiment of FIG. 12. In FIG. 12, a printer unit 80 is provided within the housing 11 of the mouse device 10 and covered by an openable cover (not shown). FIG. 12 is a plan view of the printer 80, as viewed from above, with its top being removed away. The printer unit 80 includes a flat plate-like platen 81, and a thermal head 83 mounted on a carriage 82 movable longitudinally along the platen 81.

The platen 81 supports a sheet of recording paper 121 on a frame 85 in the recording paper loading section 84 within the housing 11. The recording paper takes the form of a rectangular strip and held to the platen 81 by holding members (not shown). The carriage 82 is supported slidably on a guide shaft 88 whose ends are each attached to a respective one of a pair of spaced frames 86, 87 disposed on the housing 11, and also engaged movably with a male-screwed drive shaft 89 extending therethrough. A chain of gears 91 and 92 is provided between the drive shaft 89 and a carriage motor 90. When the carriage motor 90 is driven, its driving torque is transmitted through the gears 91 and 92 to the drive shaft 89.

In this arrangement of the printer unit 80, the home position of the thermal head 83 is spaced somewhat from the platen 81. In this state, a sheet of recording paper 121 is loaded in the loading section 84. When print information is output from the computer 60, the carriage motor 90 is rotated forwardly, and hence the drive shaft 89 is rotated also forwardly through the gears 91 and 92. Thus, the carriage 82 moves along the guide shaft 88 in the printing direction (of an arrow B), and the thermal head 83 mounted on the carriage 82 prints the print information for one line on the recording sheet 121 loaded in the loading section 84.

After printing, the thermal head 83 stops at an opposite position of the platen 81 to the home position thereof. In this state, the recorded sheet is taken out from the loading section 84. When a new recording sheet 121 is set for printing again, the carriage motor 90 is rotated reversely and the drive shaft 89 is also driven reversely through the gears 91 and 92. Thus, the thermal head 83 returns to its home position from which a printing operation similar to that mentioned above will be performed.

Even in this arrangement where print information is printed by the printer unit 80 built in the mouse device 10, any extracted part of a character string displayed on the computer display screen 60a can be printed on a recording sheet having a relatively small size so as to look to advantage as a memorandum for reading purposes, as in the printer unit 18 of the previous embodiment.

While in the embodiment the printing head is used as the thermal head and the heat-sensitive paper as the recording paper are used for illustrating purposes, an ink ribbon may be used within the housing so that an ink in the ink ribbon is thermally transferred to the recording paper for printing purposes. The printer unit may be an ink jet type that uses a miniaturized ink jet head for printing purposes.

While in the above embodiment the recording paper loading section (20) provided within the housing (11) is illustrated as having the end open at 16a on the upper surface of the housing (11), it may be provided within the housing (11) so as to have, for example, a lower end open in a bottom of the housing (11) and closable with a cover such that the recording paper may be loaded into the recording paper loading section from the outside of the housing through the lower open end.

What is claimed is:

1. A mouse device for use as an input device of a computer, said mouse device comprising:

a housing in which recording paper is loadable; and a printer unit provided within the housing for printing on the recording paper print information received from the computer;

wherein said printer unit comprises:
    a paper loading section in which the recording paper is loaded;
    feeding means for feeding the recording paper loaded in the loading section;
    a print head for printing on the recording paper fed by said feeding means; and
    a discharge port through which the recording paper is discharged by said feeding means out of the housing after printing by said print head.

2. The mouse device according to claim 1, wherein:

the discharge port is provided extending vertically so that the printed recording paper is discharged taking a substantially vertical attitude out of the housing.

3. The mouse device according to claim 1, wherein:

the discharge port is provided at a position on a side of the housing where discharge of the recorded paper is free from being hindered by a user's fingers that hold the housing when the mouse device is manipulated.

4. The mouse device according to claim 1, wherein:

the recording paper loading section has an open end through which the recording paper is loadable in the loading section; and a cover is provided for closing the open end of the loading section openably.

5. The mouse device according to claim 4, further comprising:

print head moving means, responsive to closing and opening of said cover, for moving said print head to a print position and a non-print position, respectively.

6. The mouse device according to claim 4, further comprising:

a window provided on said cover for externally confirming that the recording paper is loaded in the loading section.

7. The mouse device according to claim 1, wherein:

the recording paper comprises a roll of recording tape.

8. The mouse device according to claim 1, wherein:

the recording paper has a rectangular shape.

9. The mouse device according to claim 1, wherein:

said print head comprises a thermal head; and the recording paper comprises heat-sensitive paper that is colored by heat produced by said thermal head.

\* \* \* \* \*